Aug. 26, 1969   J. H. KRIECK   3,463,132
SYSTEM FOR INCREASING THE EFFICIENCY OF
INTERNAL COMBUSTION ENGINES
Filed June 26, 1967   2 Sheets-Sheet 1
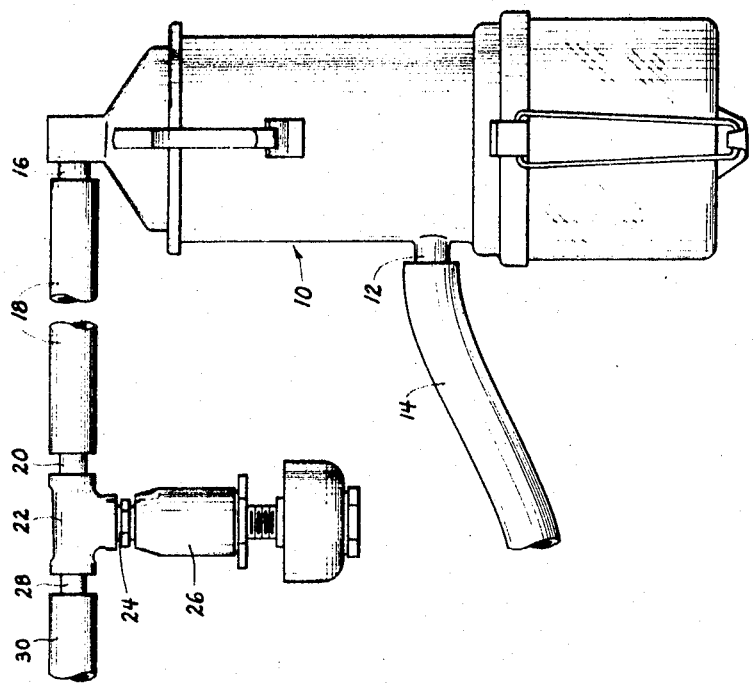
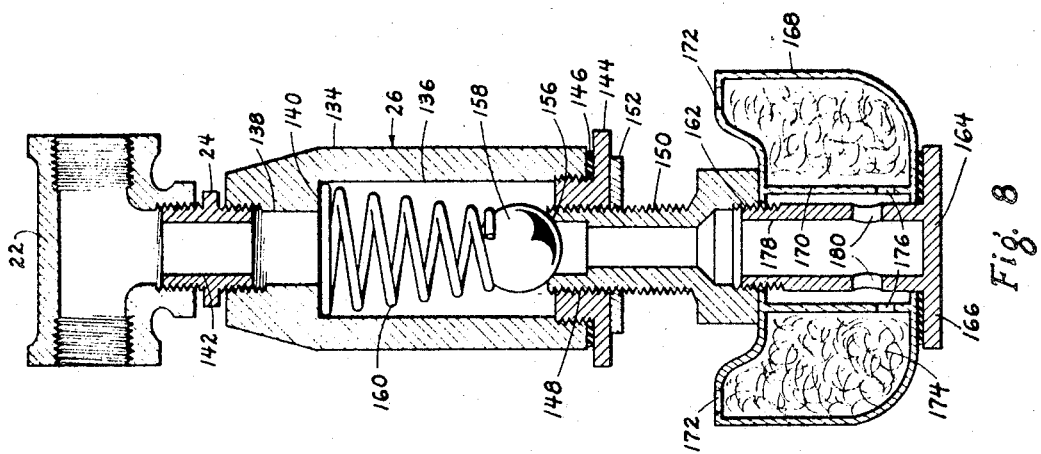
James H. Krieck
INVENTOR.
BY
William S. Dorman
ATTORNEY James H. Krieck
INVENTOR.

BY William S. Dorman
ATTORNEY

United States Patent Office 3,463,132
Patented Aug. 26, 1969

3,463,132
SYSTEM FOR INCREASING THE EFFICIENCY OF INTERNAL COMBUSTION ENGINES
James H. Krieck, P.O. Box 536,
Westport, Conn. 06880
Filed June 26, 1967, Ser. No. 648,716
Int. Cl. F02b *33/00;* F02m *35/00*
U.S. Cl. 123—119                 2 Claims

ABSTRACT OF THE DISCLOSURE

A system for improving the efficiency of an internal combustion engine including a filter unit connected between the crankcase and inlet manifold of the engine, an improved flow control valve in the filter unit, an improved filter element in the filter unit and a vacuum breaker valve in the line leading from the filter unit to the inlet manifold.

---

The present invention relates to a system for increasing the efficiency of internal combustion engines and constitutes an improvement over the inventions set forth in my prior U.S. Patents Nos. 1,990,657; 2,226,405; 2,442,696; and 2,742,057.

Each of the above patents discloses a filtering device capable of conducting vapors from the crankcase of an engine to the inlet manifold thereof. Each of these patents discloses an automatic flow control valve and a trap or reservoir for collecting certain impurities withdrawn from the gas stream.

It is the principal object of the present invention to provide a system or apparatus for further increasing the efficiency of internal combustion engines.

It is a further object of the present invention to provide an improved filtering device of the type described above wherein the filter element is so designed as to provide an increased flow therethrough.

It is a further object of the present invention to provide an improved filtering device of the type described above wherein the automatic flow control valve is provided with a more uniform response.

It is yet another object of the present invention to provide an improved filtering device of the type described above which includes a vacuum breaker valve in the line leading to the inlet manifold for the purpose of overcoming the adverse effects created by excessively high vacuum.

It is another object of the present invention to provide an improved filtering device which is of relatively simple construction, which can be manufactured economically, and which is efficient in operation.

Other and further objects and advantageous features of the present invention will hereinafter more fully appear in connection with a detailed description of the drawings in which FIGURE 1 is a semi-diagrammatic view showing the manner in which the various elements of the present invention are connected to an internal combustion engine;

FIGURE 8 is a longitudinal sectional view of the vacuum breaker valve.

Figure 2:
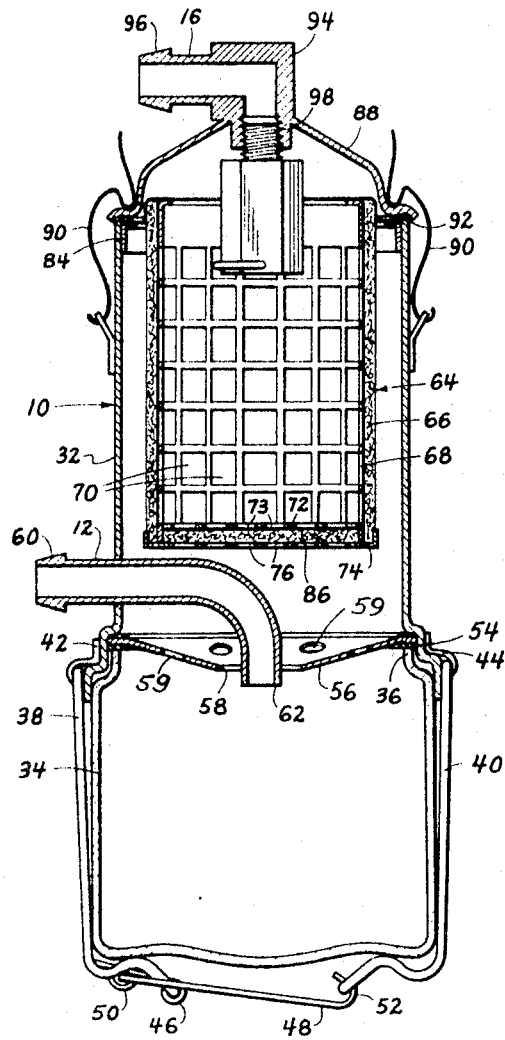
FIGURE 2 is a longitudinal cross-sectional view of the filter unit.

Referring to the drawings in detail, FIGURE 1 shows a filter unit 10 which is connected to the internal combustion engine (not shown) of an automobile in a manner similar to that disclosed and described in my prior Patent No. 2,742,057. Although the filter unit 10 will be described in greater detail hereinafter, briefly stated, an inlet pipe 12 connects with a hose 14 which, in turn, connects with the usual crankcase (not shown) of the engine. Preferably, the hose 14 is placed in communication with the crankcase by connecting this hose to the upper end of the road draft tube (not shown), the lower or discharge end of this tube being partially shut off by a plug or cork (not shown) having therein a V-groove or hole as set forth in the above mentioned patent. When no road draft tube is provided, the hose 14 may be connected to the crankcase in an equivalent manner such as suggested in the above-mentioned patent. An outlet 16 at the top of the filter unit 10 connects by means of a hose 18 with a fitting 20 on a T 22. A second fitting 24 on the T 22 connects with a vacuum breaker valve 26 which will be described hereinafter in greater detail. A third fitting 28 on the T 22 connects with a hose 30. The other end of the hose 30 connects with the fuel inlet system for the internal combustion engine by connecting this tube to the intake manifold (not shown) as set forth in Patent No. 2,742,057, or in any equivalent manner.

Figure 3:
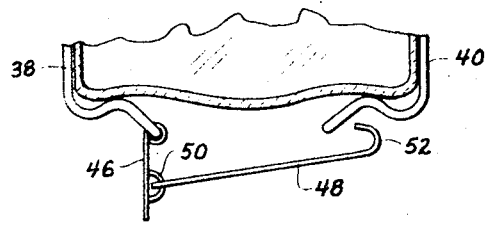
FIGURE 3 is a fragmentary sectional view of the lower portion of the filter unit of FIGURE 2 showing the lower clip in an open position.

Referring now to FIGURES 2, 3, 4, and 5 the filter unit 10 includes an upper cylindrical filter housing 32 and a lower trap 34. The trap is preferably, but not necessarily, in the form of a glass jar, the upper open end 36 of which is connected to the lower end of the filter housing 32 by means of wire straps 38 and 40. The upper ends of the straps 38 and 40 are hinge mounted to the bottom of the filter housing 32 by virtue of the metal tabs 42 and 44 which are bent and welded to the lower end of the filter housing 32 as shown. The lower ends of the straps 38 and 40 are bent inwardly and downwardly to form lower hook members as shown. As best shown in FIGURE 3, a small lever 46 is pivotally attached at its upper end to the lower end of the strap 38. An elongated link 48 is pivotally attached adjacent its left hand end to the center portion 50 of the lever 46. The right hand end of the link 48 is provided with a hook 52 which is adapted to engage the lower end of the strap 40. When the lever 46 is pivoted in a clockwise direction from the FIGURE 3 position to the FIGURE 2 position, the trap 34 is securely held against the lower end of the filter housing 32. A gasket 54 is interposed between the upper end 36 of the trap 34 and the lower end of the filter housing 32 to provide an appropriate seal.

The lower end of the filter housing 32 is partially closed by an conical baffle plate 56 having a center hole 58 therein. A plurality of additional holes or ports 59 are provided on the conical portion 56 surrounding the center hole 58 to permit a divided upward flow of gases through the baffle plate. The gasket 54, previously described, is actually compressed against the lower outer edge of the baffle plate 56. The inlet pipe 12 has an enlarged head 60 at its outer end for facilitating connection with the hose 14 previously described. The inner end of the inlet pipe 12 is bent so as to form a right angle as best shown in FIGURE 2 such that the lower end 62 of the inlet pipe 12 extends through and below the central opening 58 in the baffle plate 56. It should be noted, however, that adequate clearance is provided between the outside of the inlet pipe 12 and the baffle plate 56 where the pipe projects through the opening 58.

A filter element 64 is mounted within the filter housing 32. The filter element includes an outer porous sleeve 66 constructed of suitable design and made, for example, of woven textile material. The outer sleeve 66 is mounted on, and supported by, an inner perforated metallic sleeve 68. In order to achieve maximum flow of gas through the sleeve 66, the latter is provided with a plurality of rectangular openings 70 such that the residue of the sleeve 68 is comprised of a plurality of intersecting vertical and horizontal straps as shown. The sleeve 68 is closed adjacent its bottom by a horizontal circular plate 72 which is also perforated and which is provided with a plurality of circular holes 73 which correspond, and are aligned, with holes in the end cap later to be described.

Figure 4:
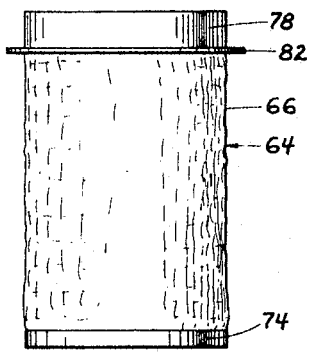
FIGURE 4 is an elevation of the filter element.
Figure 5:
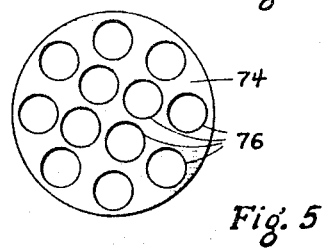
FIGURE 5 is a bottom view of the lower end cap on the filter element.

As best shown in FIGURE 4, the lower end of the filter element 64 is enclosed by a metallic end cap 74. The bottom of the end cap 74, as it appears in FIGURE 5, is provided with a plurality of circular holes 76. These holes correspond in size and position with the similar set of holes 73 in the bottom plate 72 of the sleeve 68. The upper end of the filter element 64 is covered by an upper metallic end cap 78 which has a large central opening 80 at its upper end and a horizontally extending flange 82 at its lower end. The flange 82 is adapted to rest on a shoulder 84 provided in the upper end of the filter housing 32. The space between the lower end cap 74 and the plate 72 is filled with a layer of filter material 86 which can also be made of woven textile material.

A cover 88 is releasably secured to the upper end of the filter housing 32 by means of spring clips 90 hinged to the sides of the housing 32. A gasket 92 is interposed between the lower edge of the cover 88 and the upper end of the housing 32, said gasket also overlying the flange 82 of the filter element 64. The upper end of the cover 88 has attached thereto an angled fitting 94 one portion of which constitutes the outlet 16 previously described. The outlet 16 is provided with an enlarged outer portion 96 to accommodate the hose 18 previously described. The lower and inner end of the fitting 94 is provided with a vertical threaded opening 98. The upper threaded end 100 of a flow control valve 102 (the details of which will be set forth hereinafter) is received in the opening 98.

Figure 6:
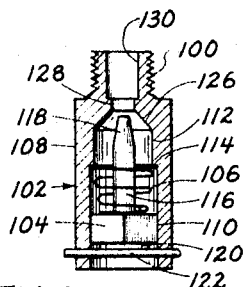
FIGURE 6 is a longitudinal cross-sectional view through the flow control valve.
Figure 7:
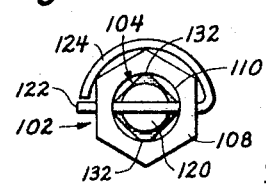
FIGURE 7 is a bottom view of the valve shown in FIGURE 6.

Referring now to FIGURES 6 and 7 the flow control valve 102 is similar in some respects to the valve 21 shown in Patent No. 2,742,057; however, in the instant case, the valve 102 is provided with a valve piston 104 of smaller mass and is also provided with a spring 106 to create a more even response. Thus, the valve 102 shown in FIGURES 6 and 7 has a main body portion 108 and an upper portion of reduced size which has been described heretofore as the threaded portion 100. The lower part of the valve body 108 is provided with a cylindrical bore 110 in which the lower end of the valve piston 104 is adapted to move upwardly and downwardly. In the central portion of the valve body 108 there is provided a cylindrical bore 112 of slightly reduced diameter from the bore 110 and merging with the bore 110 at the shoulder 114. The piston 104 is substantially square in cross-section as shown in FIGURE 7 and is provided with an upwardly extending stem 116 which is tapered at its upper end 118. The lower end of the piston 104 is provided with a circular stop 120 of reduced diameter. The upper end of the spring 106 bears against the shoulder 114 and the lower end of the spring bears against the upper surface of the valve piston 104 so as to tend to urge the valve piston 104 downwardly.

A stop pin 122 extends diametrically through the valve body 108 near the bottom thereof; one end of the stop pin 122 is bent into a semicircular loop 124 which serves to lock the stop pin 122 in position. For locking purposes, the loop portion 124 is pivoted upwardly against the valve body 108 as shown in FIGURE 7. When the valve piston 104 is in its lowermost position, the stop 120 rests against the stop pin 122.

At the upper end of the bore 112 the inner surface of the valve body tapers gradually inwardly at 126 until it meets with a circular opening or valve orifice 128. The orifice 128 also communicates with the bore 130 in the threaded portion 100. The four corners 132 of the valve piston 104 are rounded off slightly so that the valve piston 104 will slide up and down smoothly within the bore 110.

The vacuum breaker valve 26 shown in FIGURE 8 is provided with a main valve housing 134 which connects the T 22 by means of the fitting 24. The main valve body 134 is provided with a central bore 136 of generally larger diameter communicating at its upper end with a bore 138 of somewhat smaller diameter. The bores 136 and 138 communicate with each other in the region of the shoulder 140. The upper end of the bore 138 communicates with a bore 142 in the fitting 24 and this last mentioned bore communicates, in turn, with the interior of the T itself. The lower end of the valve body 134 is closed by a threaded nut 144 which engages the lower threaded end of the bore and which seals against the lower end of the body 134 by means of a gasket 146.

The nut 144 is provided with a central threaded opening 148 in which is received a hollow threaded bushing 150. The threaded bushing 150 is adjustable within the nut 144 but it can be locked in position by means of a lock nut 152. The bushing 150 is provided with an elongated bore 154 which communicates at its upper end with a tapered or curved opening 156 forming a seat for a ball 158. The ball 158 is urged into the seat 156 by means of a spring 160 which bears at its upper end against the shoulder 140 and its lower end against the top of the ball. The lower end of the bore 154 in the bushing 150 communicates with a lower threaded opening 162 in the bushing. A hollow threaded plug 164 is adapted to engage, at its upper end, with the threaded opening 162. The plug 164 is provided with an enlarged head 166 at its lower end so as to support a filter housing 168 between the head 166 and the lower end of the bushing 150.

The filter housing 168 is provided with an inner annular portion 170 which surrounds the shank of the plug 164. The exterior of the housing 168 is provided with a plurality of holes 172 which communicate with the atmosphere. The annular space between the wall 170 and the outer part of the filter housing 168 is filled with suitable filter material 174. The annular portion 170 is provided with a plurality of holes 176. The plug 164 is provided with a bore 178 which is closed at its lower end but which is provided with side holes 180 which are in communication with the holes 176 in the annular member 170.

OPERATION

As indicated heretofore, the present invention is incorporated into the internal combustion system of an automobile by connecting the hose 14 to a suitable portion of the crankcase and by connecting the hose 30 to a suitable connection on the inlet manifold. Since the pressure at the inlet manifold is generally considered to be a vacuum or partial vacuum, and since the pressure in the crankcase is generally considered to be substantially atmospheric, there will be a gas flow through the system of the present invention from the crankcase towards the inlet manifold. The gases from the crankcase, therefore, enter the filter unit 10 through the inlet 12, passing downwardly into the trap 34.

As the gases are withdrawn from the crankcase through the hose 14, fresh air will be drawn into the crankcase through the conventional filter (not shown) and pipe (not shown) connected with the crankcase. The gases withdrawn from the crankcase will include air, oil vapor, water vapor, gasoline vapor, blow-by gases, and particles of dust, carbon, sludge, etc. The heavy impurities in the vapors such as water, heavy carbon, sludge, dirt and the like drop by gravity into the trap 34, accumulating at the bottom thereof. The lighter impurities, in addition to the volatile fumes, moisture or steam and lubricating film pass upwardly from the trap 34 through the annular space 58 between the baffle 56 and the lower end 62 of the inlet pipe 12. The gases continue to pass upwardly into the interior of the filter housing 32. The gases will now pass through the filter sleeve 66 and through the perforated metallic sleeve 68 into the interior of the filter element 64. The gases can also pass into the interior of the filter element 64 through the holes in the end caps 74, the filter material 86 and the holes in the bottom plate 72. Generally speaking, the light solid impurities will be intercepted by the filter element 64.

The strained and purified gases passing through the filter element 64 will now pass through the flow control valve 102 in a manner later to be described and thence to the intake manifold of the combustion engine. The vapors admitted into the intake manifold will contain minute particles of oil or oil vapor which will eventually be deposited on the valve stems, compression rings, cylinder walls and cylinder pistons, thus greatly aiding in their lubrication. Moisture in the vapors admitted into the intake manifold will be deposited in the explosion chambers forming steam and thus reducing the formation of carbon. Any volatile fumes drawn into the intake manifold in this manner will strengthen or increase the combustibility of the explosive mixture and thereby improve the efficiency and performance of the engine.

The valve 102 automatically controls the flow of vapors into the intake manifold according to the suction in said manifold. In the absence of valve 102, as the suction in the intake manifold increases, the amount of vapors drawn from the crankcase would increase and might overload the manifold. To offset the effect of varying suction in the intake manifold, the valve 102 is provided with an orifice 128 and a means, including the piston 104 and the tapered stem 116, to decrease the effective orifice opening as the vacuum in the manifold increases. Thus, the amount of gas drawn into the intake manifold from the crankcase will be controlled automatically in the above manner.

The diameter of the orifice 128 is somewhat larger than the external diameter of the tapered stem 116, and the stem never touches the side of the orifice; thus the valve 102 can never be completely shut off regardless of the degree of vacuum achieved or, more properly, regardless of the flow conditions called for by the increased vacuum. As the vacuum increases, however, tending to draw more gas through the valve 102 the piston 104 will be moved upwardly so as to move the tapered portion 118 into the orifice 128. The higher the tapered portion 118 moves into the orifice 128, the smaller becomes the effective orifice opening. Thus, as indicated above, the valve 102 controls the flow therethrough at at substantially constant value or, more properly, the valve 102 prevents the flow of gases from the crankcase to the intake manifold from becoming excessive when the vacuum in the manifold increases excessively; it is possible to establish almost any desired quantitative increase in the rate of flow of gases through the valve 102 in response to the increase in vacuum by varying the taper 118 on the valve stem 116.

With respect to the filter element 64, a greater increase in flow (or stated differently, a diminished resistance to flow) of the gases passing through the filter element is achieved by the manner in which the perforations are provided in the perforated metallic sleeve 68. Heretofore, it was customary to punch round holes, such as the holes 76 in the bottom of the end cover 74, in the cylindrical shell of the filter element. Regardless of the hole size selected, the only way of increasing the porosity of the supporting element, such as the sleeve 68, was to move the holes closer together; however, with the holes close together, the structural rigidity of the element was reduced. On the other hand, the rectangular openings provided in the cylindrical shell of the element 68 provide a series of spaced horizontal and vertical intersecting members of substantially uniform thickness, width and length.

For example, when using a hole size of one-half inch with a minimum separation of one-tenth inch, it was discovered that the rectangular openings provide about thirteen per cent increase in open space over the round holes. The minimum amount of separation between the holes, of course, will depend somewhat upon the thickness of the sheet material used to construct the sleeve 68. Since the textile sleeve 66 is non-rigid, the rigidity for the filter element itself is provided by the sleeve 68.

Heretofore the filter element, such as that shown in my prior Patent No. 2,742,057, have been perforated along the cylindrical side only and have been closed off at the bottom. In accordance with the present invention the lower end cap 74 is perforated, an additional plate such as the circular plate 72, is provided above the end cap in spaced relation therewith and having a plurality of holes which correspond with, and are aligned with, the holes in the end cap itself. Filter material 86 is also placed in the space between the lower end cap 74 and the plate 72. By permitting the gases to pass through the bottom of the filter element 64 the amount of open space is increased approximately another ten percent. In light of the above it will be seen that the filter element is improved in two respects: first of all, the rectangular openings in the cylindrical shell increase the open area by about thirteen per cent; secondly, by permitting gases to pass through the bottom an additional ten percent open area is added to the above.

Returning again to the flow control valve 102 it should be noted that the mass of the piston 104 is somewhat less than that in my earlier Patent No. 2,742,057. However, an additional spring 106 is provided in the instant valve to give an added downward thrust to the piston 104. The spring 106 provides a more uniform control of flow through the valve 102 over the range of pressure drops encountered in service. Although the valve piston 104 has been shown and described as being 4-sided, it could be 3-sided or 5-sided or any other convenient polygonal cross-sectional shape.

Under normal operating conditions the vacuum breaker valve 26 shown in FIGURE 8 will not come into play. This valve, in fact, will not open until an excessively high vacuum is reached at the inlet manifold. When travelling along a straight flat road under normal conditions of acceleration and deceleration, no excessively high vacuum will be reached in the inlet manifold; however, when decelerating rapidly or when going downhill with the throttle closed, the vacuum which is built up in the inlet manifold tends to become excessively high. At this time a liquid saturation occurs in the manifold. This saturation of liquid, or raw gas, in the manifold makes itself evident in the form of the customary black cloud of smoke when the operator first begins to accelerate after reaching the bottom of the hill. With the vacuum breaker valve in the system as disclosed, this liquid saturation in the manifold is prevented. For example, if the vacuum becomes excessively high the ball 158 will be lifted upwardly from its seat 156 against the action of the spring 160. Air will be drawn from the atmosphere through the holes 172, the filter medium 174, the holes 176 and 180, through the interior of the vacuum breaker valve and into the hose 30 and thence to the inlet manifold. This air will burn the excess fuel in the inlet manifold thereby preventing and eliminating the formation of carbon on the spark plugs, etc.

Whereas the present invention has been described in particular relation to the drawings attached hereto, it should be understood that other and further modifications, apart from those shown or suggested herein, may be made within the spirit and scope of this invention.

What is claimed is:

1. Apparatus for use with an internal combustion engine of the type which has a crankcase and an intake manifold, for improving the efficiency of the engine, said apparatus comprising a gas inlet adapted to be connected to the crankcase, an outlet connection adapted to be connected to the manifold, in operation the flow of gases occurring through said apparatus from said inlet to said outlet connection, a trap down into which said inlet is directed, a cylindrical filter unit positioned above said trap, said filter unit having filtering material in the side wall and bottom end thereof, a flow-control valve positioned within said filter unit for controlling the flow of said gases, said flow-control valve including a valve body having a bore with a constricted orifice downstream from said bore, a piston located within said bore and movable along said bore, a stem extending from said piston toward said orifice, said flow of gases passing along said bore by said piston and pushing said piston toward said orifice for moving said stem toward said orifice, a spring acting against the flow urging said stem away from said orifice, said orifice being of larger diameter than said stem such that said stem remains spaced from said orifice at all times, thereby an increase in said flow of gases causes said piston to move aid stem toward said orifice to reduce the effective orifice opening, and vice versa, to control the flow through said valve, a vacuum breaker valve communicating directly with said outlet connection, said breaker valve having an air intake port, a seat and a movable valve element between said intake port and said outlet connection, spring means urging said valve element toward said seat, said spring means normally holding said valve element against said seat to close said breaker valve and being set to allow said breaker valve to open when excessive suction occurs within said outlet connection for admitting air directly into said outlet connection.

2. Apparatus for use with an internal combustion engine of the type which has a crankcase and an intake manifold for increasing the efficiency of said engine; said apparatus comprising a filter unit having a lower section and an upper section, an inlet adapted for connection to the crankcase, said inlet being directed downwardly into said lower section, said lower section including a detachable trap for accumulating heavy impurities, a baffle separating said lower section from said upper section, said baffle having a port allowing fumes to pass upwardly into said upper section, said upper section having an outlet, a filter element in said upper section positioned above said trap for filtering the flow of fumes from said port to said outlet, siad filter element having a sleeve of filter material surrounding a perforated metallic sleeve, and said filter element also having a perforated cap spaced below a perforated bottom plate with filter material sandwiched therebetween, providing an area of filtration in the bottom thereof and allowing drainage of condensed liquids out of said filter element to drop into said trap, a flow control valve in said upper section for controlling said flow, said valve including a valve body having a bore with a constricted orifice at the upper end thereof, a piston movable along said bore, a stem extending up from said piston toward said orifice, said orifice having a diameter larger than the diameter of said stem such that flow through said orifice continues at all times, and a spring surrounding said stem and urging said piston and stem downwardly in a direction away from said orifice.

References Cited

UNITED STATES PATENTS

| | | |
|---|---|---|
| 3,105,477 | 10/1963 | Lowther. |
| 3,263,699 | 8/1966 | Givler et al. _____ 137—480 |
| 484,942 | 10/1892 | Rourke _____ 55—484 X |
| 1,892,210 | 12/1932 | Gordon _____ 55—498 X |
| 2,114,240 | 4/1938 | Sharrard. |
| 2,170,074 | 8/1939 | Hewitt _____ 55—510 X |
| 2,174,528 | 10/1939 | Prentiss. |
| 2,226,405 | 12/1940 | Krieck. |
| 2,575,400 | 11/1951 | Shirk et al. _____ 55—500 X |
| 2,742,057 | 4/1956 | Krieck. |
| 3,059,628 | 10/1962 | Linn. |
| 3,088,447 | 5/1963 | Henderson. |
| 3,164,141 | 1/1965 | Jones. |

AL LAWRENCE SMITH, Primary Examiner

U.S. Cl. X.R.

55—498, 500, 510; 137—480; 138—45